US012468374B2

(12) United States Patent
Sharma et al.

(10) Patent No.: US 12,468,374 B2
(45) Date of Patent: Nov. 11, 2025

(54) STORAGE POWER REDUCTION IN BATTERY-OPERATED DEVICES

(71) Applicant: Western Digital Technologies, Inc., San Jose, CA (US)

(72) Inventors: Amit Sharma, Bangalore (IN); Dinesh Kumar Agarwal, Bangalore (IN); Abhinandan Venugopal, Mysore (IN)

(73) Assignee: Western Digital Technologies, Inc., San Jose, CA (US)

( * ) Notice: Subject to any disclaimer, the term of this patent is extended or adjusted under 35 U.S.C. 154(b) by 118 days.

(21) Appl. No.: 18/230,586

(22) Filed: Aug. 4, 2023

(65) Prior Publication Data

US 2025/0004533 A1 Jan. 2, 2025

Related U.S. Application Data

(60) Provisional application No. 63/523,464, filed on Jun. 27, 2023.

(51) Int. Cl.
*G06F 1/3234* (2019.01)
*G06F 1/3212* (2019.01)
*G06F 3/06* (2006.01)

(52) U.S. Cl.
CPC .......... *G06F 1/3275* (2013.01); *G06F 1/3212* (2013.01); *G06F 3/0613* (2013.01); *G06F 3/0625* (2013.01); *G06F 3/0638* (2013.01)

(58) Field of Classification Search
CPC .... G06F 1/3275; G06F 1/3212; G06F 3/0613; G06F 3/0625; G06F 3/0638
See application file for complete search history.

(56) References Cited

U.S. PATENT DOCUMENTS

| | | | | |
|---|---|---|---|---|
| 8,626,989 B2* | 1/2014 | Van Aken | ........... | G06F 12/0246 711/201 |
| 9,355,022 B2* | 5/2016 | Ravimohan | ........... | G06F 3/0679 |
| 9,471,131 B2* | 10/2016 | Ise | ........ | G06F 1/3275 |
| 9,612,649 B2* | 4/2017 | Nachimuthu | ....... | G06F 12/0888 |
| 10,539,996 B2* | 1/2020 | HomChaudhuri | .... | G06F 12/123 |
| 12,147,351 B2* | 11/2024 | Erickson | ............ | G06F 12/0882 |
| 2007/0011421 A1* | 1/2007 | Keller, Jr. | ............. | G06F 1/3275 713/320 |

(Continued)

OTHER PUBLICATIONS

International Search Report and Written Opinion for International Application No. PCT/US2024/012247, dated May 23, 2024, 9 pages.

*Primary Examiner* — Aurel Prifti
(74) *Attorney, Agent, or Firm* — Gabriel Fitch; LOZA & LOZA, LLP

(57) ABSTRACT

Techniques are provided for optimizing the power consumption of a data storage device included in a battery-operated device. The battery-operated device (e.g., portable devices like wearable devices, smartwatches, and mobile phones) can access certain data stored on the data storage device more frequently when the device operates on battery power as compared to when the device does not operate on battery power. Techniques are provided for identifying and classifying data into different classifications, for example, power sensitive data and non-power sensitive data. Then the device can optimize the battery power consumption of the data storage device by storing or relocating data stored at the data storage device based on the classification of the data.

20 Claims, 12 Drawing Sheets

(56) References Cited

U.S. PATENT DOCUMENTS

| | | | |
|---|---|---|---|
| 2010/0070801 A1 | 3/2010 | Cornwell et al. | |
| 2013/0205067 A1* | 8/2013 | Kettner | G06F 3/0679 |
| | | | 711/E12.008 |
| 2013/0205073 A1 | 8/2013 | Hwang et al. | |
| 2015/0074358 A1* | 3/2015 | Flinsbaugh | G06F 3/0604 |
| | | | 711/155 |
| 2015/0199126 A1* | 7/2015 | Jayasena | G06F 12/0292 |
| | | | 711/170 |
| 2016/0048354 A1* | 2/2016 | Walsh | G06F 3/0688 |
| | | | 711/206 |
| 2016/0132392 A1 | 5/2016 | Ioannou et al. | |
| 2016/0378655 A1* | 12/2016 | Blagodurov | G06F 12/0811 |
| | | | 711/122 |
| 2017/0228322 A1* | 8/2017 | Chang | G06F 3/061 |
| 2018/0011761 A1* | 1/2018 | Cai | G06F 11/1016 |
| 2018/0107598 A1* | 4/2018 | Prodromou | G06F 12/0811 |
| 2019/0332298 A1* | 10/2019 | Madabhushi | G06F 3/0679 |
| 2021/0182206 A1* | 6/2021 | Raasch | G06F 11/0772 |
| 2021/0191864 A1* | 6/2021 | Cho | G06F 1/3275 |
| 2022/0083254 A1* | 3/2022 | Lee | G11C 13/0061 |
| 2024/0281049 A1* | 8/2024 | Aung | G06F 1/3212 |

\* cited by examiner

STORAGE POWER REDUCTION IN BATTERY-OPERATED DEVICES

CROSS REFERENCE TO RELATED APPLICATIONS

This application claims priority to and the benefit of U.S. Provisional Application No. 63/523,464, entitled "STORAGE POWER REDUCTION IN BATTERY-OPERATED DEVICES" filed Jun. 27, 2023, the entire content of which is incorporated herein by reference as if fully set forth below in its entirety and for all applicable purposes.

FIELD

The subject matter described herein relates to battery-operated devices with data storage. More particularly, the subject matter relates, in some examples, to techniques for reducing storage power consumption in battery-operated devices.

INTRODUCTION

Data storage devices (DSDs)—such as solid state devices (SSDs) with non-volatile memories (NVMs)—are utilized in a wide variety of devices in stationary and mobile computing environments. Examples of such devices include desktop computers, portable notebook computers, portable hard disk drives, mobile devices, cellular phones, portable media players, wearable devices, etc.

Wireless technology has accelerated the adoption of various battery-operated devices that include SSDs. Some examples include wireless headphones, fitness trackers, smartphones, and smartwatches. These battery-operated devices include more features with each new generation and need more storage space for enabling the additional features. Users of these devices consistently want the battery to last longer. Thus, it would be desirable to provide improvements to these battery-operated devices to enable longer operating time on battery power. Aspects of the present disclosure are directed to these and other ends.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

One aspect of the disclosure provides an apparatus comprising a battery, a non-volatile memory (NVM) coupled to the battery, and a processor coupled to the battery and the NVM. The battery is configured to provide power to the apparatus during a battery power cycle and to be charged during a charging cycle. The NVM comprises prestored data. The processor is configured to receive, from a host, power sensitive data (PSD) information that indicates a first portion of the prestored data has been used more frequently than a second portion of the prestored data during the battery power cycle. The processor is further configured to modify storage of at least the first portion of the prestored data in the NVM based on the PSD information.

In one aspect of the disclosure, a host comprises a communication interface and a processor coupled to the communication interface. The communication interface is configured for communicating with an apparatus configured to receive power from a battery during a battery power cycle and comprising a non-volatile memory (NVM) comprising prestored data. The processor is configured to determine that a first portion of the prestored data has been used more frequently during the battery power cycle of the apparatus than a second portion of the prestored data. The processor is further configured to send, to the apparatus, power sensitive data (PSD) information that indicates the first portion of the prestored data.

Another aspect of the disclosure provides an apparatus comprising a battery, a non-volatile memory (NVM) coupled to the battery, and a processor coupled to the battery and the NVM. The battery is configured to provide power to the apparatus during a battery power cycle and to be charged during a charging cycle. The NVM comprises prestored data. The processor is configured to receive, from a host, an indication to conserve battery power during the battery power cycle. The processor is further configured to receive, from the host, an indication of whether the battery is in the battery power cycle or the charging cycle. The processor is further configured to determine a first portion of the prestored data has been used more frequently than a second portion of the prestored data during the battery power cycle. The processor is further configured to modify storage of data in the first portion of the prestored data in the NVM based on the determination to thereby reduce power consumption associated with future sensing operations used to retrieve the prestored data.

Another aspect of the disclosure provides a method of operating a data storage device (DSD). The method comprises providing a battery configured to provide power to the DSD during a battery power cycle and to be charged during a charging cycle. The method further comprises providing a non-volatile memory (NVM) coupled to the battery and prestored data in the NVM. The method further comprises receiving, from a host, power sensitive data (PSD) information that indicates a first portion of the prestored data has been used more frequently than a second portion of the prestored data during the battery power cycle. The method further comprises modifying storage of at least the first portion of the prestored data in the NVM based on the PSD information.

Another aspect of the disclosure provides an apparatus operatable by battery power. The apparatus comprises means for providing power to the apparatus using a battery during a battery power cycle and during a charging cycle of the battery. The apparatus further comprises means for storing prestored data in a non-volatile memory (NVM) coupled to the battery. The apparatus further comprises means for receiving, from a host, power sensitive data (PSD) information that indicates a first portion of the prestored data being used more frequently than a second portion of the prestored data during the battery power cycle. The apparatus further comprises means for modifying storage of at least the first portion of the prestored data in the NVM based on the PSD information.

DETAILED DESCRIPTION

Figure 1:
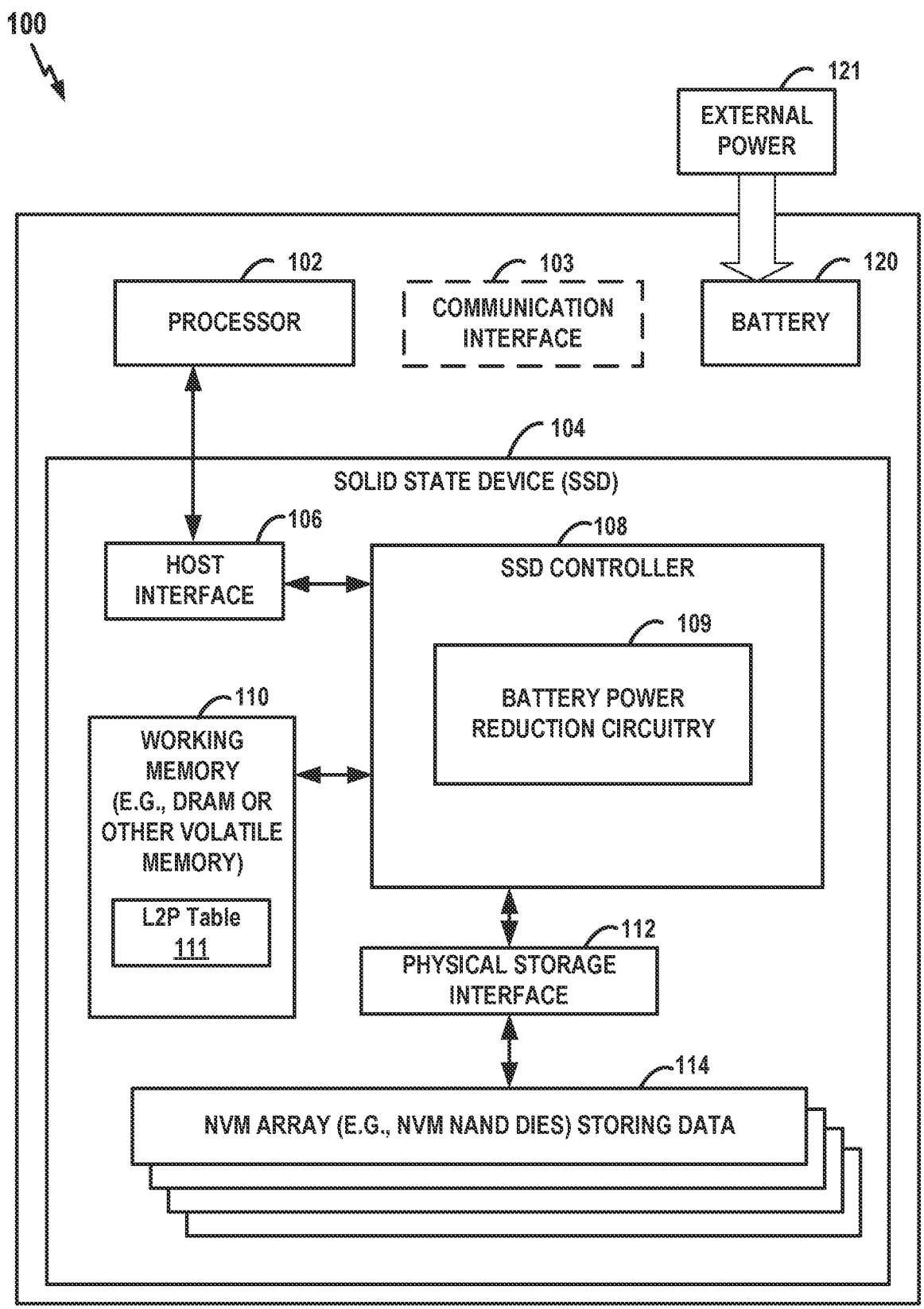
FIG. 1 is a schematic block diagram illustrating a battery-powered device that includes an exemplary data storage system embodied as a solid-state device (SSD) according to some aspects of the disclosure.

In the following detailed description, reference is made to the accompanying drawings, which form a part thereof. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

The examples herein primarily relate to battery powered devices that include a data storage device (DSD) and techniques for optimizing the power consumption of the data storage or memory included in a battery-powered device, and more particularly to reducing power consumption of the DSD while the device is powered with the battery to prolong use of the battery before charging is needed. A battery-operated device (e.g., portable devices like wearable devices, smartwatches, and mobile phones) can access certain data stored on the DSD more frequently than other data while the device is operating on battery power. Some aspects of the disclosure provide techniques to identify types of data and classify the data using different classifications, including for example, power sensitive data and non-power sensitive data. Then the DSD can optimize the power consumption of the DSD based on the classification of the data stored at the DSD.

In the main examples described herein, the DSD includes non-volatile memory (NVM) (e.g., NVM arrays) for storing various data. In some examples, a DSD with NVM arrays may be referred to as a solid state device (SSD). One example of SSD is a Universal Flash Storage (UFS) that uses NVM arrays as the main storage. Some SSDs use NAND flash memory, herein referred to as "NANDs." A NAND is a type of non-volatile storage technology that does not require power to retain data. It exploits negative-AND, i.e., NAND, logic. For the sake of brevity, an SSD having one or more NAND dies will be used as a non-limiting example of a DSD below in the description of various embodiments. It should be understood that at least some aspects described herein may be applicable to other forms of DSDs as well. For example, at least some aspects described herein may be applicable to phase-change memory (PCM) arrays, magneto-resistive random access memory (MRAM) arrays, and resistive random access memory (ReRAM) arrays. In still other examples, the DSD may be a hard disk drive (HDD) or a tape drive.

More generally, aspects of the disclosure relate to any battery-operated data storage device using NVM as data storage, which need not be a DSD but may be any of a wide variety of devices.

Overview

The present disclosure sets forth methods and apparatus that reduce power consumption of a data storage device (e.g., operating on battery power) by storing data in NVM based on a power classification of the data. Data stored in the data storage device can be classified as power sensitive data (PSD) and non-power sensitive data (NPSD). The present disclosure provides various techniques to store, organize, and manage the data in the data storage device based on the power classification of the data and the power status of the device. The power status of the device includes a battery-operated state and a non-battery-operated state (e.g., charging). During the battery-operated state, the data storage device operates on battery power.

Exemplary Devices, Systems and Procedures

FIG. 1 is a schematic block diagram illustrating a battery-powered device 100 including an exemplary data storage system in accordance with aspects of the disclosure. In this example, the battery-powered device 100 includes a processor 102 that can be configured to perform various functions of the device, including, for example, functions typically performed by portable devices like wearable devices (e.g., earbuds, headphones, etc.), smartwatches, mobile phones, and other such devices. These functions can include wireless communications with other devices (e.g., smartphones, computers, etc.) and application specific functions. The battery-operated device 100 can be powered by a battery 120 (e.g., one or more battery cells) that can be recharged as needed, for example, using an external power source 121 (e.g., a wall charger). In one example, the battery-operated device 100 may include a solid state device (SSD) 104 for storing data at the device.

In some aspects, the processor 102 can be a host that provides commands to the SSD 104 for transferring data between the processor 102 (host) and the SSD 104. In some example, the host can be an entity outside of the battery-operated device 100. In this case, the processor 102 can communicate (e.g., receive commands) with the external host using a communication interface 103. For example, the host (e.g., processor 102 or an external host) may provide a write command to the SSD 104 for writing data to the SSD 104 or a read command to the SSD 104 for reading data from the SSD 104. The host (e.g., processor 102) may be any system or device having a need for data storage or retrieval and a compatible interface for communicating with the SSD 104. In some examples, the host (e.g., processor 102) and the SSD 104 may be included in the same device 100, for example, a computing device, personal computer, portable computer, workstation, server, personal digital assistant, digital camera, smartphone, smartwatch, fitness tracker, wearable device, etc.

The SSD 104 includes a host interface 106, an SSD controller 108, a working memory 110 (such as dynamic random access memory (DRAM) or other volatile memory), a physical storage (PS) interface 112 (e.g., flash interface module (FIM)), and an NVM array 114. The NVM array 114 can have one or more memory dies for storing data. The host interface 106 is coupled to the SSD controller 108 and facilitates communication between the host (e.g., processor 102) and the SSD controller 108. The SSD controller 108 is coupled to the working memory 110 as well as to the NVM array 114 via the PS interface 112. In some examples, the SSD controller 108 may include the PS interface 112. The host interface 106 may be any suitable communication interface, such as an NVMe interface, a Universal Serial Bus (USB) interface, a Serial Peripheral (SP) interface, an Advanced Technology Attachment (ATA) or Serial Advanced Technology Attachment (SATA) interface, a Small Computer System Interface (SCSI), an IEEE 1394 (Firewire) interface, or the like. In some embodiments, the host (e.g., processor 102) and the SSD 104 are included in the same device. In other embodiments, the SSD 104 is remote from the host (e.g., a remote host) or is contained in a remote computing system communicatively coupled with the host. For example, the host may communicate with the SSD 104 through a wireless or wired communication link. The NVM array 114 may include multiple dies (e.g., NAND flash dies).

Although, in the example illustrated in FIG. 1, SSD 104 includes a single channel between SSD controller 108 and NVM array 114 via PS interface 112, the subject matter described herein is not limited to having a single memory channel. For example, in some NAND memory system architectures, two, four, eight, or more NAND channels can couple the controller and the NAND memory device, depending on controller capabilities. In any of the embodiments described herein, more than a single channel may be used between the controller and the memory die, even if a single channel is shown in the drawings. The SSD controller 108 may be implemented in a single integrated circuit chip and may communicate with different layers of memory in the NVM 114 over one or more command channels.

The SSD controller 108 controls the operation of the SSD 104. In various aspects, the SSD controller 108 receives commands from the host (e.g., processor 102) through the host interface 106 and performs the commands to transfer data between the host and the NVM array 114. Furthermore, the SSD controller 108 may manage reading from and writing to working memory 110 for performing the various functions effected by the controller and to maintain and manage cached information stored in the working memory 110.

The SSD controller 108 may include any type of processing device, such as a microprocessor, a microcontroller, an embedded controller, a logic circuit, software, firmware, or the like, for controlling the operation of the SSD 104. In some aspects, some or all of the functions described herein as being performed by the SSD controller 108 may instead be performed by another element of the SSD 104. For example, the SSD 104 may include a microprocessor, a microcontroller, an embedded controller, a logic circuit, software, firmware, ASIC, or any kind of processing device, for performing one or more of the functions described herein as being performed by the SSD controller 108. According to other aspects, one or more of the functions described herein as being performed by the SSD controller 108 are instead performed by the host (e.g., processor 102). In still further aspects, some or all of the functions described herein as being performed by the SSD controller 108 may instead be performed by another element such as a controller in a hybrid drive including both non-volatile memory elements and magnetic storage elements.

In some aspects, the SSD controller 108 can include circuitry (e.g., battery power reduction circuitry 109) that can perform various functions to reduce the consumption of battery power by the SSD. For example, the battery power reduction circuitry 109 can perform various functions and procedures to optimize the power consumption of the device 100 (e.g., SSD 104) and more particularly to reduce power consumption of the SSD while the device is powered with the battery 120 to prolong use of the battery before charging is needed.

The working memory 110 may be any suitable memory, computing device, or system capable of storing data. For example, working memory 110 may be ordinary RAM, DRAM, double data rate (DDR) RAM, static RAM (SRAM), synchronous dynamic RAM (SDRAM), a flash storage, an erasable programmable Read Only-memory (EPROM), an electrically erasable programmable ROM (EEPROM), or the like. In various embodiments, the SSD controller 108 can use the working memory 110, or a portion thereof, to store data during the transfer of data between the host 102 and the NVM array 114. In some examples, the working memory 110 can include only volatile memory. For example, the working memory 110 or a portion of the working memory 110 may be a cache memory. The NVM array 114 receives data from the SSD controller 108 via the PS interface 112 and stores the data. In some embodiments, working memory 110 may be replaced by a non-volatile memory such as MRAM, PCM, ReRAM, etc. to serve as a working memory for the overall device.

In some aspects, the NVM array 114 may be implemented using NAND flash memory. In one aspect, the NVM array 114 may be implemented using any combination of NAND flash, PCM arrays, MRAM arrays, and/or ReRAM. The PS interface 112 provides an interface to the NVM array 114. For example, in the case where the NVM array 114 is implemented using NAND flash memory, the PS interface 112 may be a flash interface module. In one aspect, the PS interface 112 may be implemented as a component of the SSD controller 108. In the example of FIG. 1, the SSD controller 108 may include hardware, firmware, software, or any combinations thereof that provide the above-described functionality.

Although FIG. 1 shows an exemplary SSD 104 and an SSD is generally used as an illustrative example in the description throughout, the various disclosed embodiments are not necessarily limited to an SSD application/implementation. As an example, the disclosed NVM array and associated processing components can be implemented as part of a package that includes other processing circuitry and/or components. For example, a processor may include, or otherwise be coupled with, embedded NVM array and associated circuitry. The processor could, as one example, off-load certain operations to the NVM and associated circuitry and/or components. As another example, the SSD controller 108 may be a controller in another type of device and still be configured to perform or control some or all of the other functions described herein.

In some aspects, the battery-operated device 100 can operate on battery power and/or external power. For example, the battery-operated device 100 can include a battery 120 that supplies power to the battery-operated device 100 during a battery power cycle. Further, the battery 120 can be recharged using an external power source 121 during a charging cycle. During charging, the battery-operated device 100 can be powered by the external power source 121 and/or the battery 120. In some aspects, the host (e.g., processor 102) can operate on battery power (e.g., battery 120) and can be a component of the battery-operated device 100. In other aspects, the host can be powered by a power source other than the battery 120. Thus, the host and the battery-powered device 100 can be powered by the same power source or different power sources.

Classification of Data Stored in Device

In some aspects, the data stored at the SSD 104 can be classified into different power categories to facilitate various power consumption optimization techniques described below. For example, the data stored or prestored at the SSD can be classified into power sensitive data (PSD) and non-power sensitive data (NPSD). PSD can include data that is more frequently used (e.g., read, write, generated, deleted) than other data when the battery-operated device 100 is operating on battery power. When the battery 120 is being charged during a charging cycle, the device 100 can be powered by a power source 121 external to the device. If PSD is more frequently used, or only used, when the device 100 operates on battery power (e.g., exclusively and not on power from an external charging source), optimizing the power usage of the SSD in accessing PSD can optimize (e.g., reduce) the power consumption of the device (e.g., SSD 104 and device 100). In some aspects. NPSD can include data (e.g., software code or data) that is only used when the device is not operating on battery power (e.g., in a charging cycle) and/or data that is infrequently/rarely used. The device 100 does not operate on battery power when the device is charging and/or powered by an external power source external (e.g., external power 121).

In one example, PSD can include data (e.g., software code) used for noise cancellation. For example, the device 100 may be a set of wireless headphones that provide noise cancellation to a user of the device. The device typically operates on battery power exclusively when noise cancellation is enabled, and accesses the data (e.g., software code) corresponding to noise cancellation more frequently when the device operates on battery power as compared to when the device operates in a charging cycle where power is provided from a charging power source.

In one example, the PSD can include data (e.g., software code) used for voice command functionality. For example, the device 100 may be a set of wireless headphones or another wearable device that can provide voice command functionality or a device connected (e.g., wireless connection) to a cellular phone that provides voice assistant functions. The device typically operates on battery power exclusively when the voice command features are used. Therefore, the device will access the data corresponding to the voice command features more frequently when the device operates on battery power as compared to when the device is being charged.

In some aspects. PSD can include other types of data that are more frequently used (or only used) when the device operates on battery power as compared to when the device is being charged. For example, the device 100 may be a smartwatch or fitness tracker that can provide various fitness tracking functions (e.g., timers, exercise routines, health metrics tracking routines, heart rate monitoring, satellite-based positioning functions, etc.) which may be used more frequently (or only used) when the device operates on battery power as compared to when the device is being charged.

Because PSD is used only or more frequently used when the device operates on battery power, usage of PSD can have a larger impact on the battery consumption of the device than NPSD does. In one example, NPSD can include data (e.g., charging software) that is typically only used when the device is idle and/or being charged. For example, NPSD can include data (e.g., update software) used for device software update checks. In some aspects, the device may have some features that are infrequently used when the device is in use as compared to other features. In one example, the device can be a smartwatch. In this case, some settings (e.g., screen brightness, sound level, tracking configuration, etc.) are used less frequently than activity tracking. Therefore, data (e.g., setting control software) used for the settings can be classified as NPSD. In other examples, PSD and NPSD can respectively include other types of data that have different usage profiles.

Figure 2:
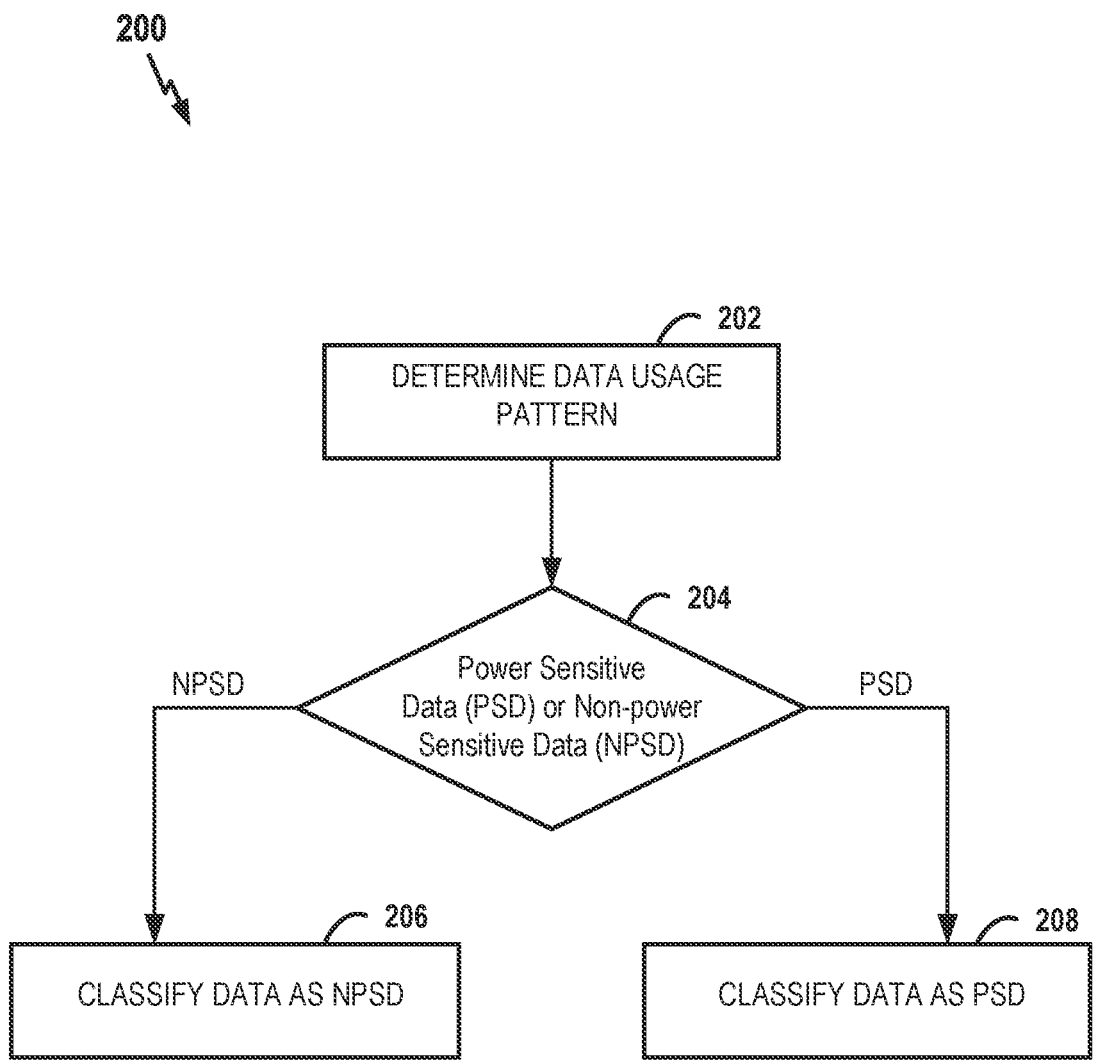
FIG. 2 is a flow chart illustrating a process of classifying data stored at a data storage device according to some aspects of the disclosure.

FIG. 2 is a flow chart illustrating a process 200 of classifying data stored at a data storage device according to some aspects of the disclosure. In some examples, data can be classified as PSD or NPSD based on the usage pattern of the data. At 202, the host (e.g., processor 102) or the SSD 104 can determine the usage pattern of various data in the device. The usage pattern can include the usage information of the data when the SSD operates on battery power or not (e.g., battery, charging). At block 204, the device can determine the PSD and NPSD based on the usage pattern.

At block 206, the host/SSD can classify the data as NPSD when it is determined that the data is only used as the device is charging and/or infrequently used when the device operates on battery power as compared to when the device is not using battery power (e.g., charging). At block 208, the device can classify the data as PSD when it is determined that the data is only used as the device operates on battery power and/or frequently used when the device operates on battery power as compared to when the device is not using battery power (e.g., charging). Further, the classification (PSD or NPSD) of the data can be dynamically changed based on changes determined in usage patterns of the data. The host/SSD can repeat the process 200 to update the classification of the data. In some examples, the classification of PSD and NPSD of certain data may be known or predetermined without tracking the usage patterns. For example, software update routines can be classified as NPSD because this type of data is infrequently or not used when the device operates on battery power or is being actively used by a user.

Figure 3:
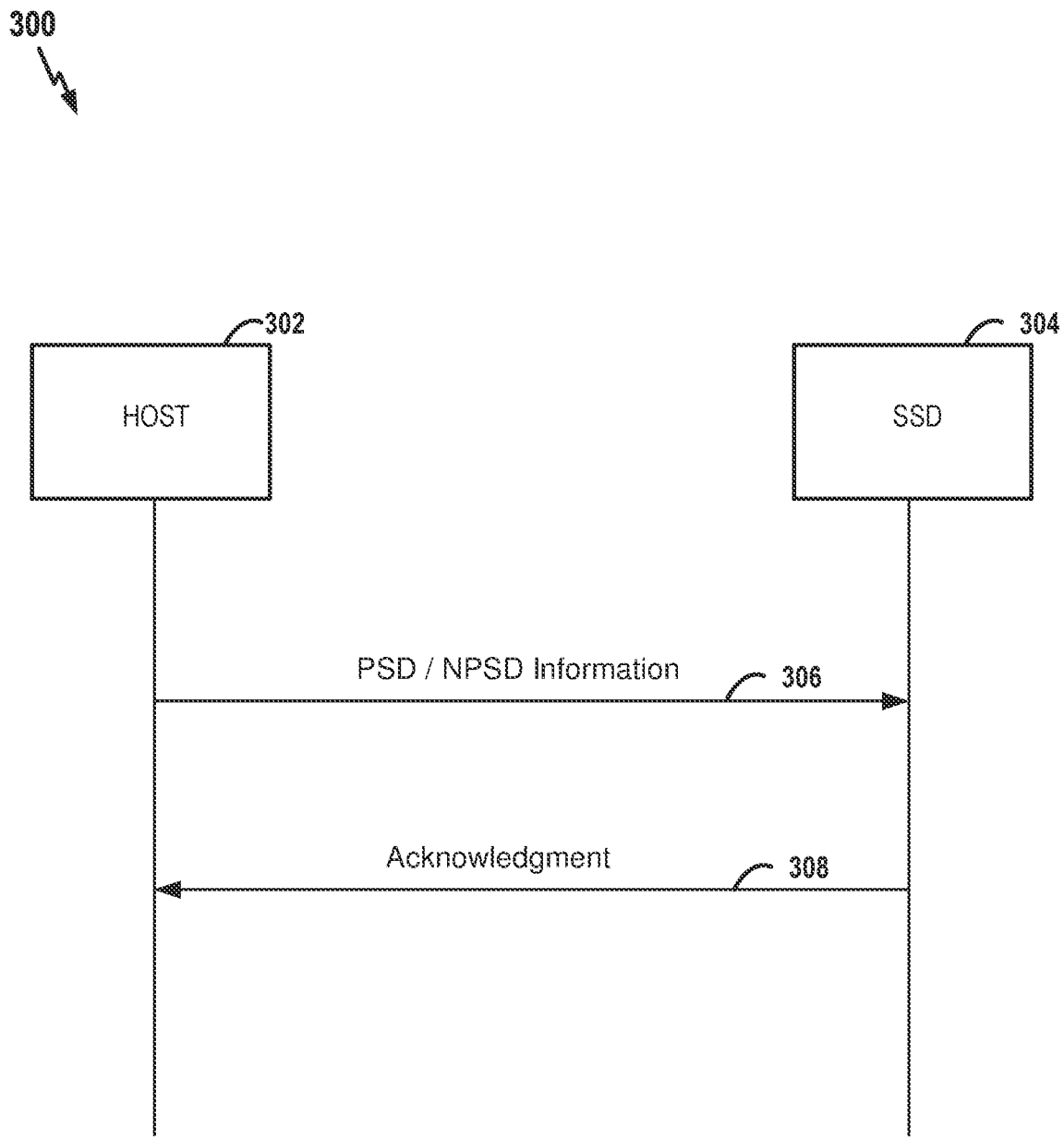
FIG. 3 is a diagram illustrating exemplary data power classification communication between a host and an SSD according to some aspects of the disclosure.

FIG. 3 is a diagram illustrating exemplary data power classification communication between a host and an SSD according to some aspects of the disclosure. In one example, a host 302 can send power usage classification (e.g., PSD and NPSD information 306) of data to be stored or prestored at an SSD 304. For example, the PSD/NPSD information 306 can include one or more logical block address (LBA) ranges for PSD and/or NPSD. The SSD 304 maps (e.g., using a flash translation (FTL) table) the logical block address ranges to corresponding physical address ranges of data blocks (e.g., prestored data) in the NVM of the SSD that store the data that is being classified as either PSD or NPSD. The use of LBAs enables the host to read or write data by referencing the logical block addresses rather than physical locations in the SSD. In response to receiving the PSD/NPSD information 306, the SSD 304 can send an acknowledgment 308 to the host 302. In some aspects, the communication between the host and the SSD can use the Universal Flash Storage (UFS) protocol or any suitable communication protocol (e.g., embedded MultiMediaCard (eMMC)). The host 302 can send the PSD/NPSD information 306 to the SSD 304 when the devices are first powered up or connected. In some aspects, another entity, not the host, can send the PSD/NPSD information to the device. Also, the host 302 can send the PSD/NPSD information 306 to the SSD 304 when it is already in use. For example, the host 302 may need to update the LBA ranges of the PSD/NPSD because the usage pattern of data at the SSD has changed over time. With the PSD/NPSD information, the host/SSD can optimize or reduce the power consumption associated with accessing the data (e.g., PSD and NPSD) stored in the SSD using various techniques described below.

Sensing Operation of NVM

Figure 4:
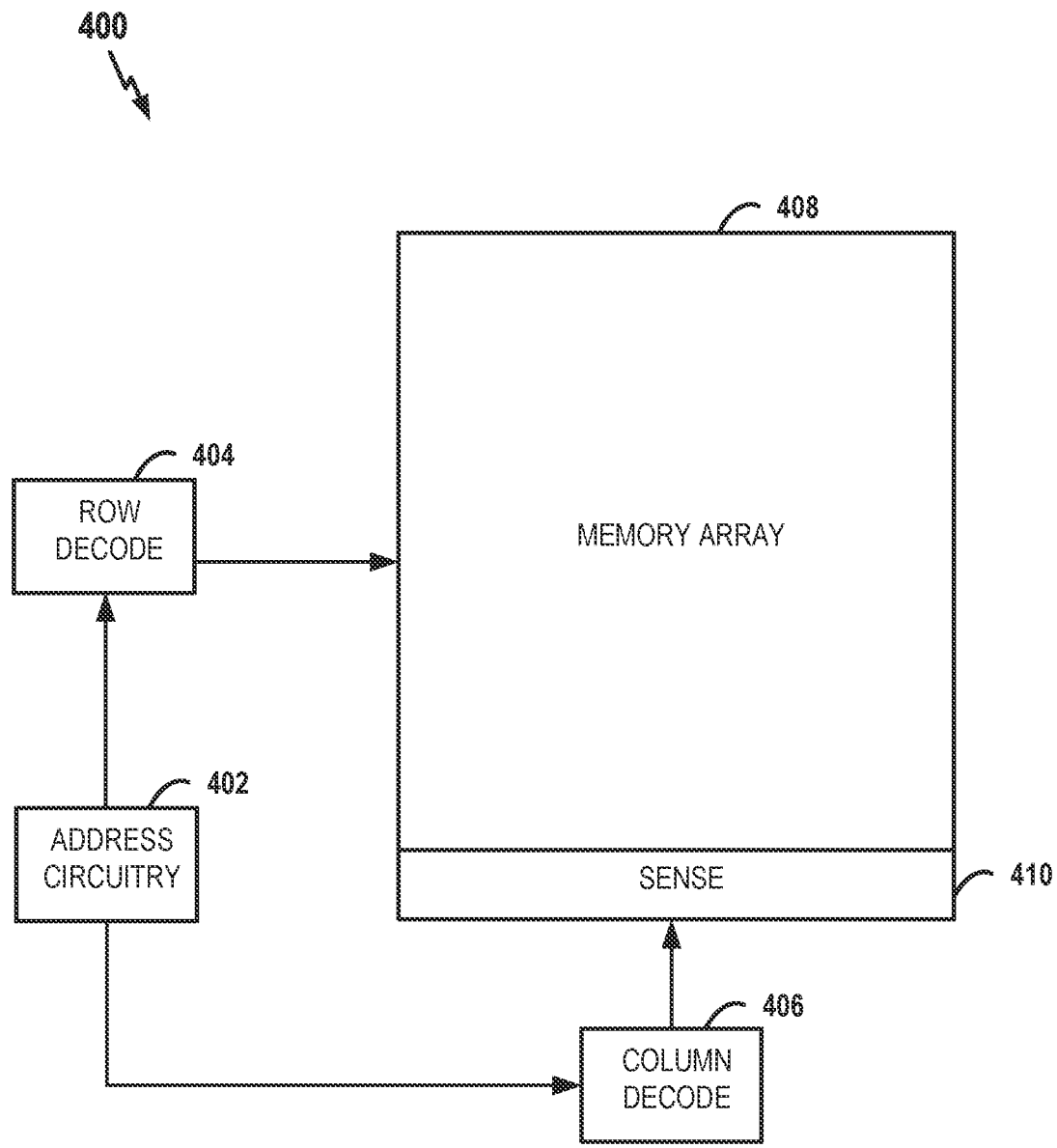
FIG. 4 is a block diagram of an SSD with a non-volatile memory (NVM) and configured to perform a memory sensing operation on the NVM according to some aspects of the disclosure.

FIG. 4 is a block diagram of an SSD 400 with a NVM and configured to perform a memory sensing operation on the NVM according to some aspects of the disclosure. In some aspects, SSD 400 may be the SSD 104 of FIG. 1. The SSD 400 includes address circuitry 402 to receive address signals from a controller (e.g., SSD controller 108) or a host (e.g., processor 102). The address can be decoded by a row decoder 404 and a column decoder 406 to access a memory array 408 (e.g., NAND array). In one aspect, the memory array 408 can store data in NVM cells (e.g., NAND flash cells) organized in a two-dimensional array of rows and columns. In SSD 400, a page of data can correspond to one or more rows. Data can be read from memory array 408 by sensing voltage and/or current changes of the memory cells using sensing circuitry 410. For example, the sensing circuitry 410 can read and latch (e.g., temporarily store) a page (corresponding to one or more rows of cells) of data from the memory array 408. When reading data from the memory array 408, the sensing circuitry 410 can detect and amplify the electrical signals produced by the addressed memory cells. The sensing circuitry 410 compares the voltage levels of the memory cells to one or more reference voltages to determine the stored data. Each cell can store one or more bits. For example, a single-level cell (SLC) can store a single bit, and a triple-level cell (TLC) can store 3 bits. The sensing circuitry 410 read data from the cells by a page or row boundary.

Sensing operations (e.g., performed by the sensing circuitry 410) can consume a significant amount of power. For example, sensing operations can involve various sub-processes including cell precharging, cell activation, sense amplification, and data output. Therefore, optimizing the sensing operations (e.g., while the SSD is on battery power) can optimize (e.g., reduce) the power consumption of the SSD 400 and extend the amount of time the device can be used on battery power. In some aspects, the SSD 400 can reduce the use of sensing operations by aligning and/or moving the data in the memory array 408 according to the PSD and/or NPSD classifications as will be described below.

Figure 5:
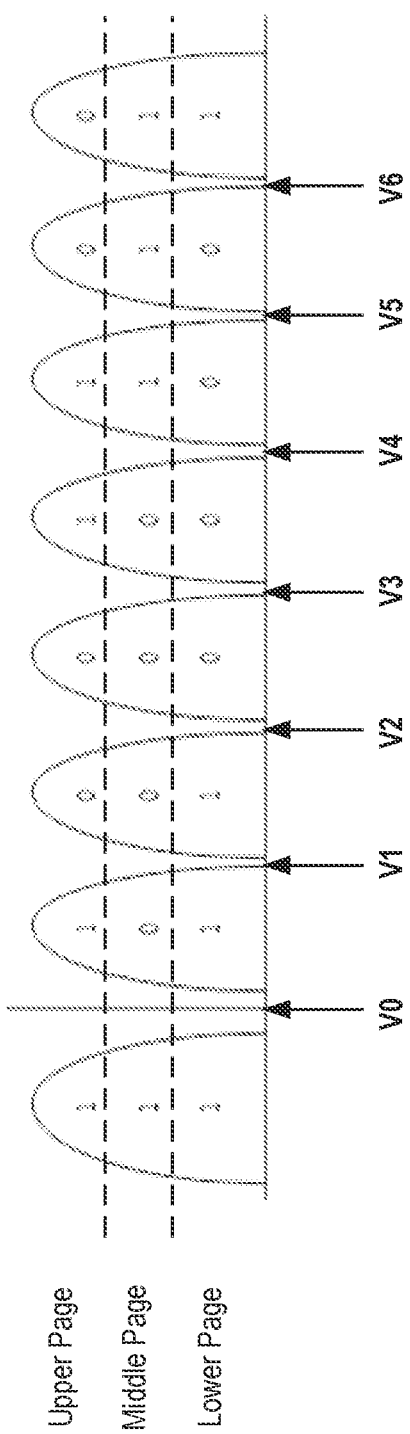
FIG. 5 is a diagram illustrating an exemplary memory sensing operation of triple-level cell (TLC) memory according to some aspects of the disclosure.

FIG. 5 is a diagram illustrating an example of a memory sensing operation of a TLC cell according to some aspects of the disclosure. In a TLC cell, the data value is determined by sensing the voltage level within the cell. A TLC cell can store multiple bits of information by assigning different voltage levels to represent different states (e.g., ranging from 000 to 111 in binary). In a sensing operation, a voltage can be applied to the TLC cell, and the resulting current flow is measured. The current flow is then compared to predefined voltage thresholds to determine the state of the cell. The sensing circuitry needs to perform two or three senses to determine the data or state stored in the TLC cell. For example, if lower page data is to be retrieved from the TLC cell, the sensing circuitry can perform two senses, one at each of voltage points V2 and V6. After these two senses, the sensing circuitry can predict if the cell has a value 0 or 1 for lower page data. For middle page data, the sensing circuitry can perform senses at voltage points V0 and V4 (e.g., two senses) to determine the middle page bit value. For upper page data, the sensing circuitry can perform senses at voltage points V1, V3, and V5 (e.g., three senses) to determine the upper page data. In comparison, only one sense is needed for reading SLC memory.

Optimizing Sense Operations of PSD in NVM

Figure 6:
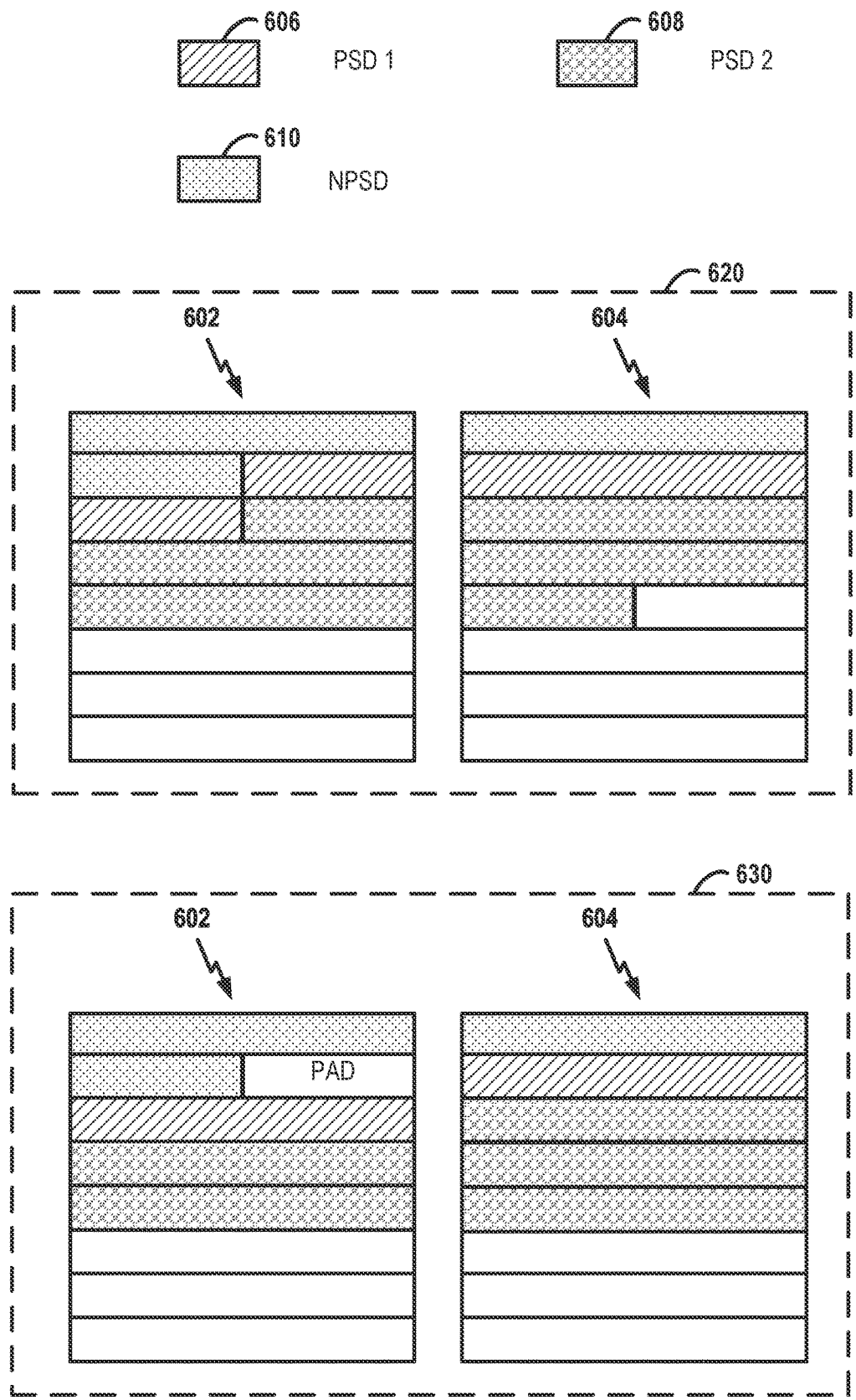
FIG. 6 is a diagram illustrating exemplary techniques for optimizing sensing operations of data stored in an SSD according to some aspects of the disclosure.

FIG. 6 is a diagram illustrating techniques for optimizing sensing operations by aligning data stored in an SSD according to some aspects of the disclosure. The SSD (e.g., SSD 104) may include a number of NVM dies (first die 602 and second die 604 shown in FIG. 6). In FIG. 6, each data page may include one or more rows of memory cells (e.g., NAND cells). In FIG. 6, each row can correspond to a page boundary of the NVM die. The SSD may store various data (e.g., PSD and NPSD) at the NVM dies. In a first example 620, the SSD stores first PSD 606 across two pages in the first die 602 and one page in the second die 604, and stores second PSD 608 across three pages in the first die 602 and three pages in the second die 604. The SSD also stores NPSD 610 in the dies 602 and 604. To read data from a certain page, the SSD needs to perform a sensing operation for the whole page where the desired data is stored even when the data only occupy a portion of the page. For the first PSD 606, the SSD needs to perform three senses to read the data from the dies. For the second PSD 608, the SSD needs to perform six senses to read the data from the dies.

In some aspects, the SSD can reduce the number of sensing operations used to read the PSD by storing or repositioning the PSD in alignment with the page boundary of the dies. In a second example 630, the SSD stores the first PSD 606 across one page in the first die 602 and one page in the second die 604, and stores the second PSD 608 across two pages in the first die 602 and three pages in the second die 604. With the alignment (or re-alignment) of PSDs by page boundary of the dies, the SSD only needs to perform two senses to read the first PSD 606 from the dies, and five senses to read the second PSD 608 from the dies. Thus, as compared to the first example 620, the second example 630 illustrates a savings of one less sense operation for each of the first PSD 606 and the second PSD 608.

Rearranging Data during Charging to Optimize Sense Operations

Figure 7:
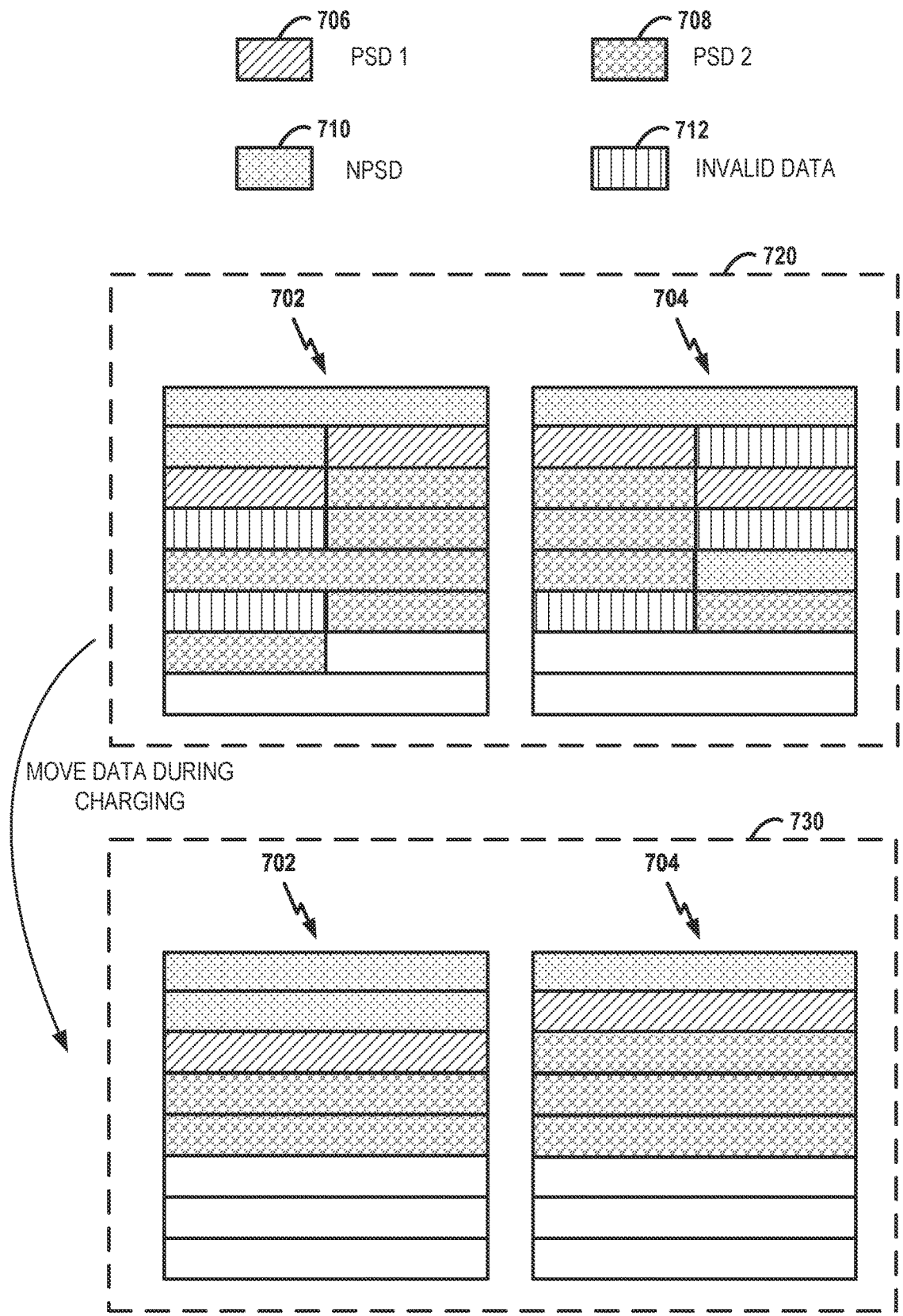
FIG. 7 is a diagram illustrating techniques for optimizing sensing operations by rearranging data stored in an SSD during a charging cycle according to some aspects of the disclosure.

FIG. 7 is a diagram illustrating techniques for optimizing sensing operations by rearranging (or repositioning) data stored in an SSD during a charging cycle according to some aspects of the disclosure. In some aspects, the SSD may be the SSD 104 of FIG. 1. The SSD can include a number of NVM dies (first die 702 and second die 704 of FIG. 7). Each row of the dies corresponds to a page boundary. The SSD may store various data including PSD and NPSD at the dies. In a first example 720, the SSD can store first PSD 706, second PSD 708, and NPSD 710 in the dies. To read data from a page, the SSD needs to perform a sense for that page even if only the desired data only occupy a portion of the page. In some aspects, the data can be scattered among multiple pages. In example 720, the first PSD 706 is stored across two pages in the first die 702 and two pages in the second die 704. Therefore, four senses are needed to read the first PSD 706. Further, the second PSD 708 is stored across five pages in the first die 702 and four pages in the second die 704. Therefore, nine senses are needed to read the second PSD 708.

In some aspects, when the SSD is charging and/or powered by an external power source, the SSD can rearrange the data (PSD and NPSD) in the dies to reduce the number of senses needed to read the data from the dies. In one aspect, it is advantageous to perform this data relocation process when the SSD is charging and/or powered by an external power to avoid using battery power. In example 730, the SSD moved the first PSD 706 during charging such that the first PSD 706 is stored in one page (e.g., a single row) in the first die 702 and one page in the second die 704. The SSD also moved the second PSD 708 during charging such that the second PSD 708 is stored in two pages in the first die 702 and three pages in the second die 704. After the relocation of the first PSD 706 and second PSD 708, the SSD can read these data using fewer senses. Further, the SSD can move the NPSD 710 during charging such that the NPSD 710 is stored in two pages in the first die 702 and one page in the second die 704. After the relocation of the NPSD 710, the SSD can read the NPSD from the dies using fewer senses. Thus, as compared to the first example 720, the second example 730 illustrates a savings of two less sense operations for the first PSD 706, a saving of four less sense operations for the second PSD 708, and a saving of one less sense operation for the NPSD.

In some aspects, the above-described data relocation process can be a part of a garbage collection function of the SSD. The garbage collection function identifies data blocks that contain invalid or deleted data (e.g., invalid data 712) and consolidates the valid data into fewer blocks. This process helps to reclaim unused space and improve the efficiency of subsequent write operations.

Reducing Power Consumption when Writing Data to NVM

Figure 8:
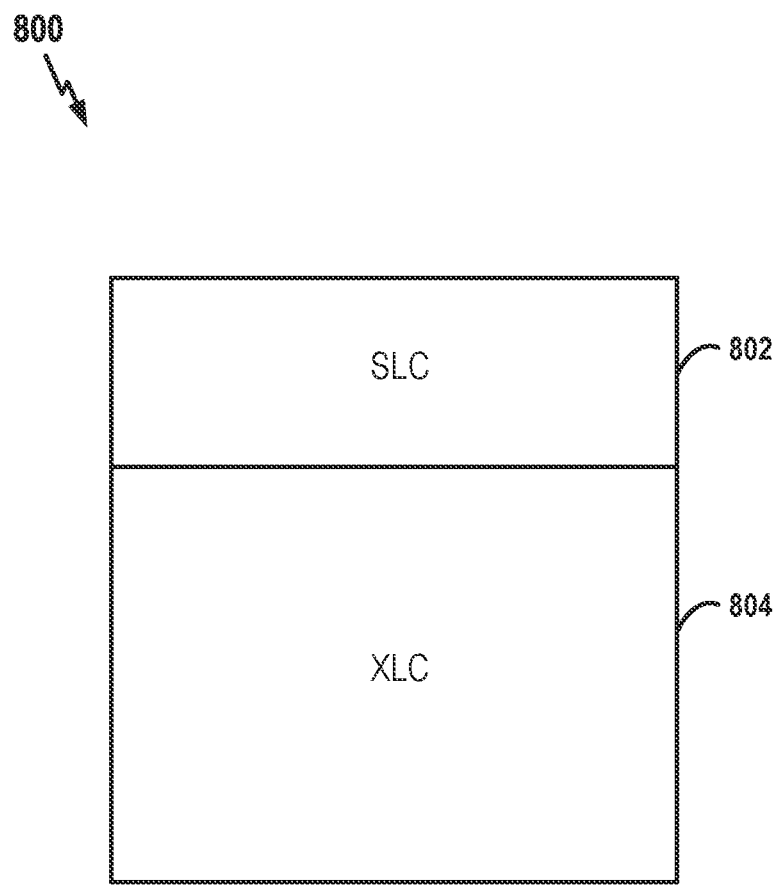
FIG. 8 is a diagram conceptually illustrating an NVM configured with different types of memory cells according to some aspects of the disclosure.

FIG. 8 is a diagram conceptually illustrating an NVM 800 configured with different types of memory cells according to some aspects of the disclosure. In one example, the NVM 800 may be used in the SSD 104 of FIG. 1. The memory cells of NVM 800 may be configured into one or more types of cells, for example, SLC 802 and XLC 804. SLC 802 can store a single bit per cell, and XLC 804 can store multiple bits (e.g., two or more bits) per cell. Some examples of XLC are multi-level cell (MLC) that can store two bits per cell, triple-level cell (TLC) that can store three bits per cell, and quad-level cell (QLC) that can store four bits per cell. While XLC can store more bits per cell than SLC. XLC has slower performance compared to SLC. This is because the NVM 800 uses more sensing cycles to read data from XLC than from SLC. The same is generally true for writing data to XLC as compared to SLC. Therefore, reading data from and writing data to XLC (e.g., MLC, TLC, QLC) can consume more power than performing those actions using SLC.

In some aspects, the NVM 800 can be used in a battery-operated device (e.g., smartwatches, fitness trackers, portal electronic devices, mobile phones, etc.). In one example, the battery-operated device can be the device 100 including the SSD 104 of FIG. 1. When the device operates on battery power, the device can generate various data that needs to be stored in the NVM 800. One example is activity tracking information (e.g., physical activities such as steps taken, distance traveled, and floors climbed). Another example is heart rate information (e.g., continuous or periodic measurements of a user's heart rate) during exercise and rest. Another example is sleep monitoring information (e.g., sleep patterns, duration, quality, and stages). Another example is location tracking information (e.g., route, pace, and distance traveled during activities like running or cycling). Another example is health metrics information (e.g., blood oxygen saturation (SpO2), stress levels, respiration rate, or body temperature).

In some aspects, a battery-powered device 100 can inform or configure the SSD to write the data to faster memory (e.g., SLC 802) (if available) instead of slower memory (e.g., XLC 804), to reduce power consumption when the device operates on battery power. That is, the SSD or SSD controller can have a bias or preference of writing data to faster memory (e.g., SLC 802) when the SSD operates on battery power. To that end, the host (e.g., processor 102) can communicate power status information to the SSD to facilitate power optimization.

Figure 9:
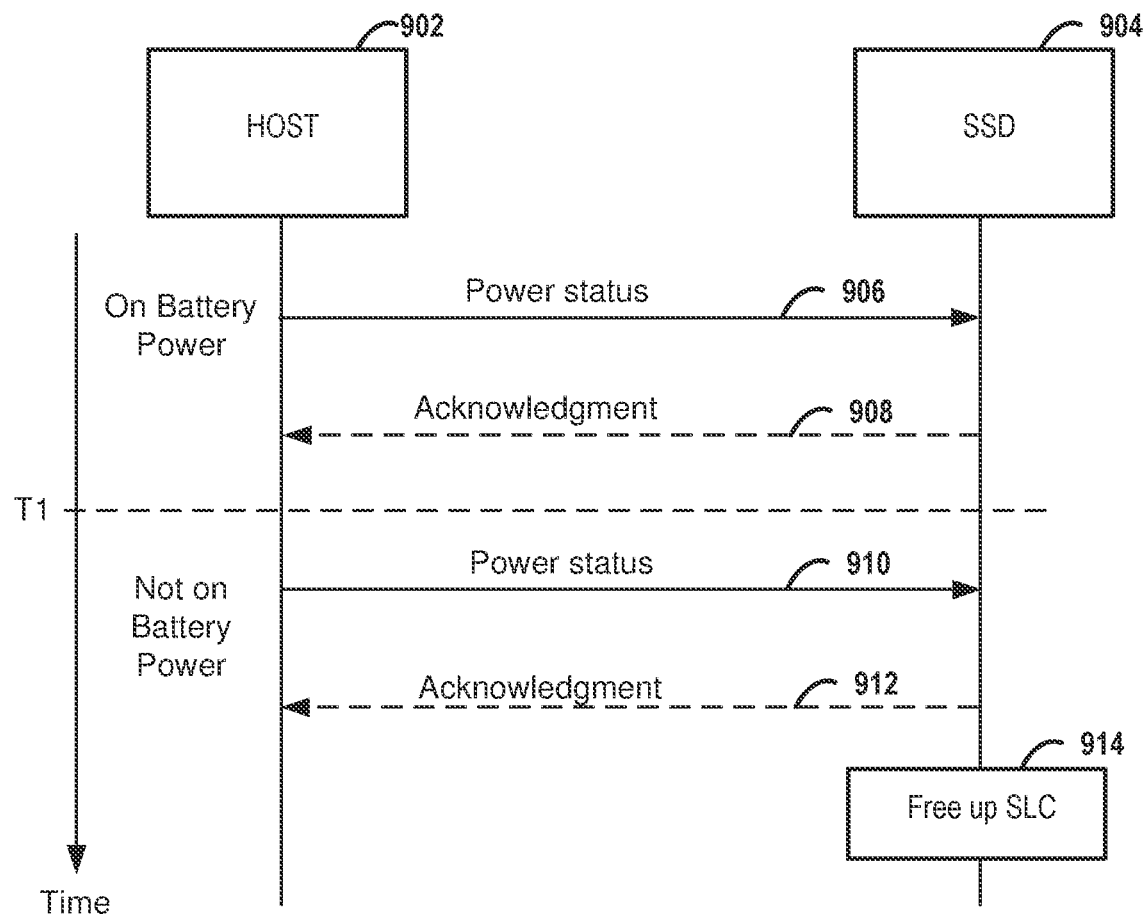
FIG. 9 is a diagram illustrating exemplary power status communication between a host and a data storage device according to some aspects of the disclosure.

FIG. 9 is a diagram illustrating exemplary power status communication between a host 902 and an SSD 904 according to some aspects. In one example, the host 902 can be the processor 102 of FIG. 1, and the SSD 904 can be the battery-operated SSD 104 of FIG. 1. When the SSD 904 operates on battery power, the host can send a power status indication 906 that can cause the SSD 904 to prioritize writing data to faster memory cells, for example SLC, over slower memory cells (e.g., XLC such as MLC or TLC). In some examples, the SSD 904 can optionally send an acknowledgment 908 to the host in response to receiving the power status indication 906. At time T1, the host and the SSD 904 can be powered by an external power source (i.e., not on battery power), for example, during a charging cycle of the battery. In this case, the host can send another power status indication 910 that can cause the SSD 904 to stop prioritizing writing data to faster memory (e.g., SLC) over slower memory (e.g., XLC). In some examples, the SSD 904 can optionally send an acknowledgment 912 to the host in response to receiving the power status indication 910.

At 914, when the SSD 904 does not operate on battery power (e.g., powered by an external power source), the SSD (e.g., an SSD controller 108) can free up some SLC space by moving data from the SLC to XLC (e.g., MLC or TLC). Because XLC can store more bits per cell, more available storage can be created in the SLC by moving data from SLC to XLC. In one aspect, it is advantageous to perform the above-described process (to prioritize writing data to SLC) to reduce the power consumption associated with writing data to NVM when the SSD is powered by the battery.

Reducing Sense Operation by Storing PSD in SLC

In some aspects, the battery-operated device 100 can store PSD in faster memory (e.g., SLC 802), if available, instead of slower memory (e.g., XLC 804) to reduce power consumption of the SSD. Typically, reading data from XLC uses more sensing operations and/or takes a longer sensing time than SLC. Therefore, reading data from XLC can consume more power than reading data from SLC. In some aspects, the SSD can prioritize storing PSD in faster memory like SLC (if available) to optimize (e.g., reduce) power consumption because retrieving PSD has a larger impact on battery consumption than retrieving NPSD. That is, the SSD can have a preference for storing PSD in faster memory than slower memory, and as a result, power consumption during a battery cycle can be reduced.

Reducing Overheads of Read Operations

In some aspects, the battery-operated device 100 can reduce the overhead associated with read operations of PSD by storing the associated logical-to-physical (L2P) table (also known as a flash translation layer (FTL) table) in faster memory instead of slower memory (e.g., NAND flash). For example, the SSD 104 can store the L2P table 111 (see FIG. 1) in DRAM, SRAM, or other volatile memory (e.g., working memory 110) that can consume less power than flash memory for read and write operations (e.g., by reducing the number of accesses to flash memory). The L2P table, also known as the mapping table or flash translation table, is a data structure that maps logical block addresses to physical block addresses. The L2P table is used to manage the mapping between logical block addresses (LBAs) and physical block addresses (PBAs) in the flash memory. When a host (e.g., processor 102) issues a read or write command to a specific logical block address, the SSD translates that logical address to a physical address using the L2P table. Therefore, storing the L2P table for at least PSD in the working memory (e.g., RAM) can reduce the power consumption of the SSD (e.g., on battery), in particular for PSD which has a larger impact on battery consumption than NPSD does.

Figure 10:
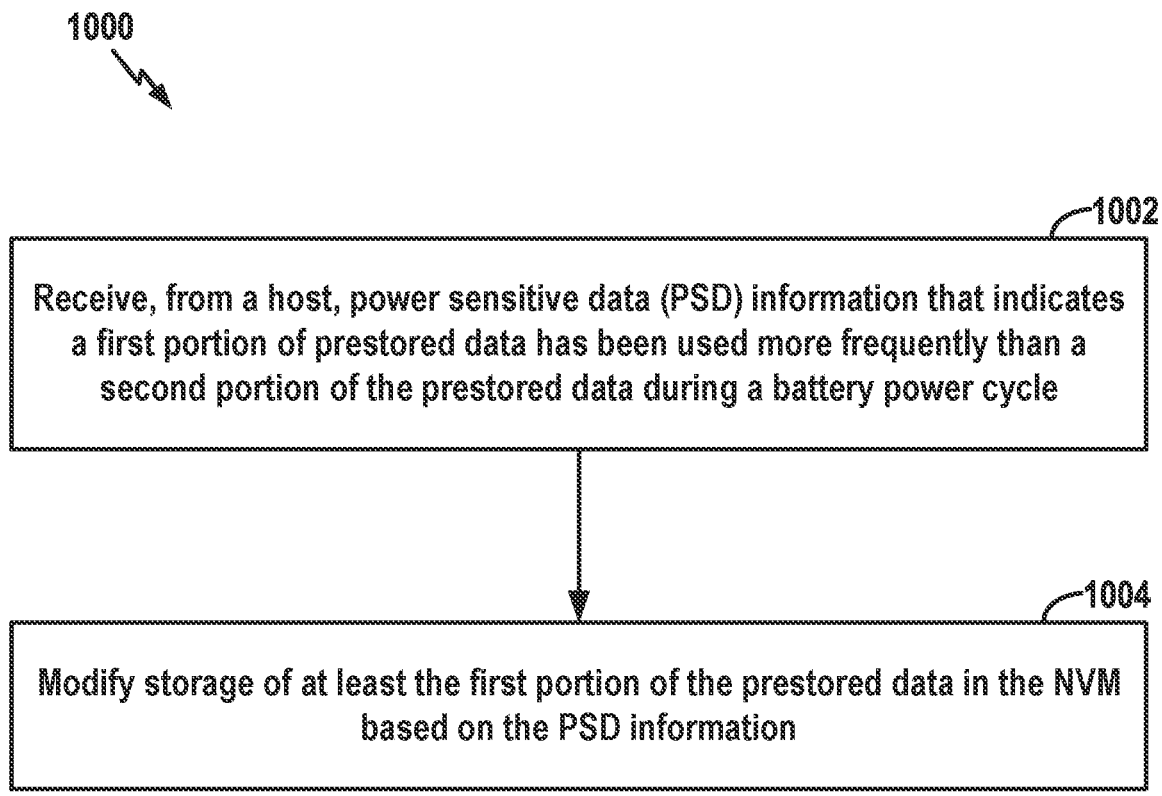
FIG. 10 is a flow chart illustrating a method of storing data in a battery-operated device according to some aspects of the disclosure.

FIG. 10 broadly illustrates a method 1000 according to one or more aspects of the disclosure for use by an apparatus. In one example, the apparatus may be the battery-operated device 100 of FIG. 1 which include an SSD 104. The DSD includes a memory controller (e.g., SSD controller 108) and a plurality of NVM cells (e.g., NVM array 114, memory array 408). At block 1002, the apparatus receives, from the host (e.g., processor 102), power sensitive data (PSD) information (e.g., information 306 of FIG. 3) that indicates a first portion of prestored data has been used more frequently than a second portion of the prestored data during a battery power cycle. At block 1004, the apparatus modifies storage of at least the first portion of the prestored data in the NVM based on the PSD information.

In some aspects, the apparatus relocates data in the first portion of the prestored data in the NVM based on the PSD information to reduce a number of pages used to store at least the first portion of the prestored data after the relocation. In some aspects, the apparatus align data in the first portion of the prestored data by a page boundary of the NVM to reduce a number of pages in the NVM used to store the first portion of the prestored data after the alignment.

In some aspects, the PSD information includes a logical block address (LBA) range for the first portion of the prestored data, and the apparatus determines, based on the LBA range, the first portion of the prestored data.

In some aspects, the apparatus stores the first portion of the prestored data in a first type of cells of the NVM; and stores the second portion of the prestored data in a second type of cells of the NVM, wherein the first type of cells is configured to store more bits per cell than the second type of cells.

In some aspects, the apparatus caches a logical-to-physical (L2P) table with table entries for mapping the first portion of the prestored data and thereby to reduce an access time associated with retrieving the first portion of the prestored data from the NVM during the battery power cycle.

In some aspects, the apparatus relocates, during the charging cycle of the battery, data of the first portion of the prestored data to align the prestored data with a page boundary of the NVM and to thereby reduce power consumption associated with future sensing operations used to retrieve the prestored data.

In some aspects, the apparatus reduces the number of pages used to store the prestored data in the NVM during the relocation of the data of the first portion.

In some aspects, the NVM includes a first type of cells and a second type of cells, the first type of cells configured to consume less power than the second type of cells during a data writing procedure. The apparatus receives an indication from the host to store data generated at the apparatus during the battery power cycle in the first type of cells; and store the battery power cycle generated data in the first type of cells. In some aspects, the apparatus frees up space in the first type of cells during the charging cycle by being configured to move data from the first type of cells to the second type of cells during the charging cycle.

In some aspects, the apparatus (e.g., battery-operated device 100) can communicate with the host (e.g., an external host) using wireless communication (e.g., Bluetooth, Wi-Fi, etc.).

Figure 11:
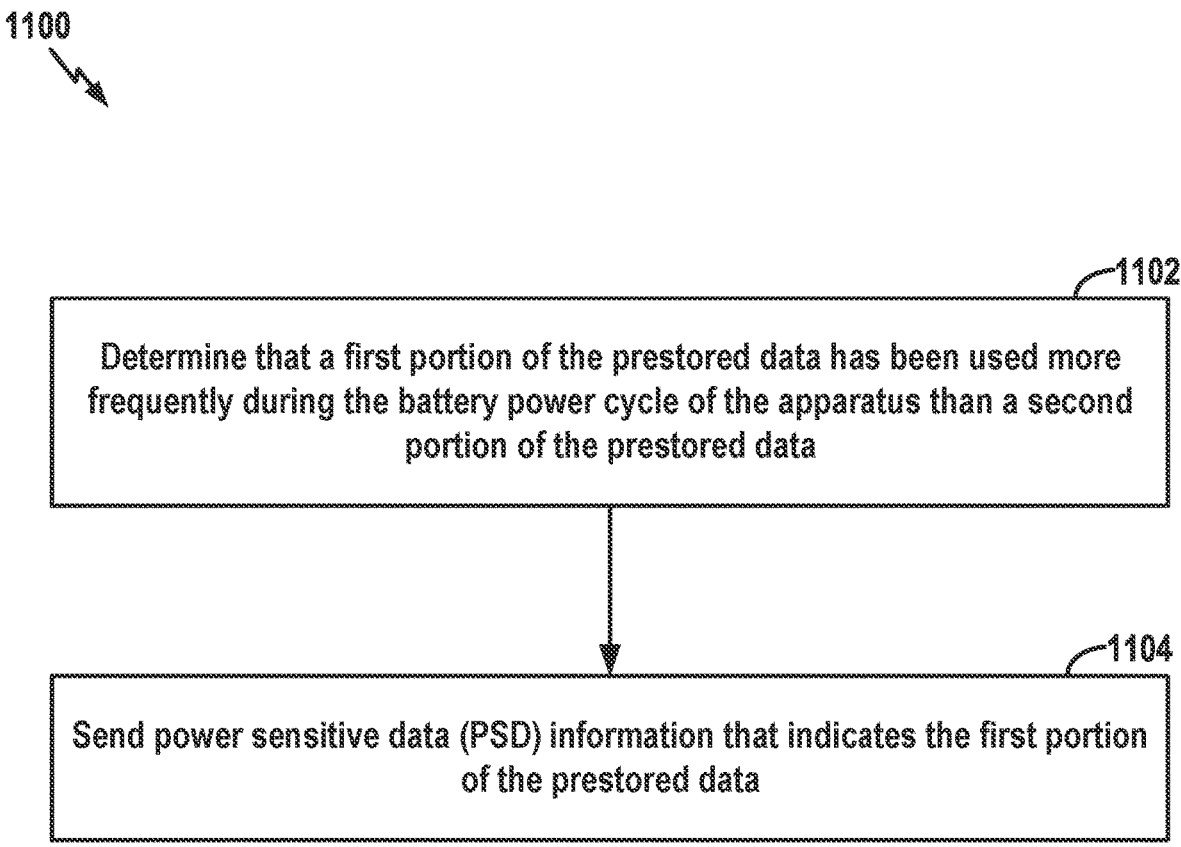
FIG. 11 is a flow chart illustrating a method of sending power sensitive data (PSD) information to a battery-operated device according to some aspects of the disclosure.

FIG. 11 broadly illustrates a method 1100 according to one or more aspects of the disclosure for use by a host. In one example, the host may be the processor 102 of FIG. 1 that can communicate with the battery-operated device 100 or any host that can store data at the SSD 104. In one example, the host may be an external host not included in the battery-operated device 100. The battery-operated device can receive power from a battery 120 during a battery power cycle and includes a non-volatile memory (NVM) with prestored data. At 1102, the host can determine that a first portion of the prestored data has been used more frequently during the battery power cycle of the battery-operated device 100 than a second portion of the prestored data. At 1104, the host can send, to the battery-operated device 100, power sensitive data (PSD) information that indicates the first portion of the prestored data.

In some aspects, the host can send, to the device, a logical block address (LBA) range corresponding to the first portion of the prestored data. In some aspects, the NVM of the device includes a first type of cells and a second type of cells, the first type of cells configured to consume less power than the second type of cells in a data writing operation. The host can send, to the device, an indication to store data in the first type of cells during the power cycle of the battery.

Exemplary Apparatus Having Circuitry for Optimizing Power Consumption

Figure 12:
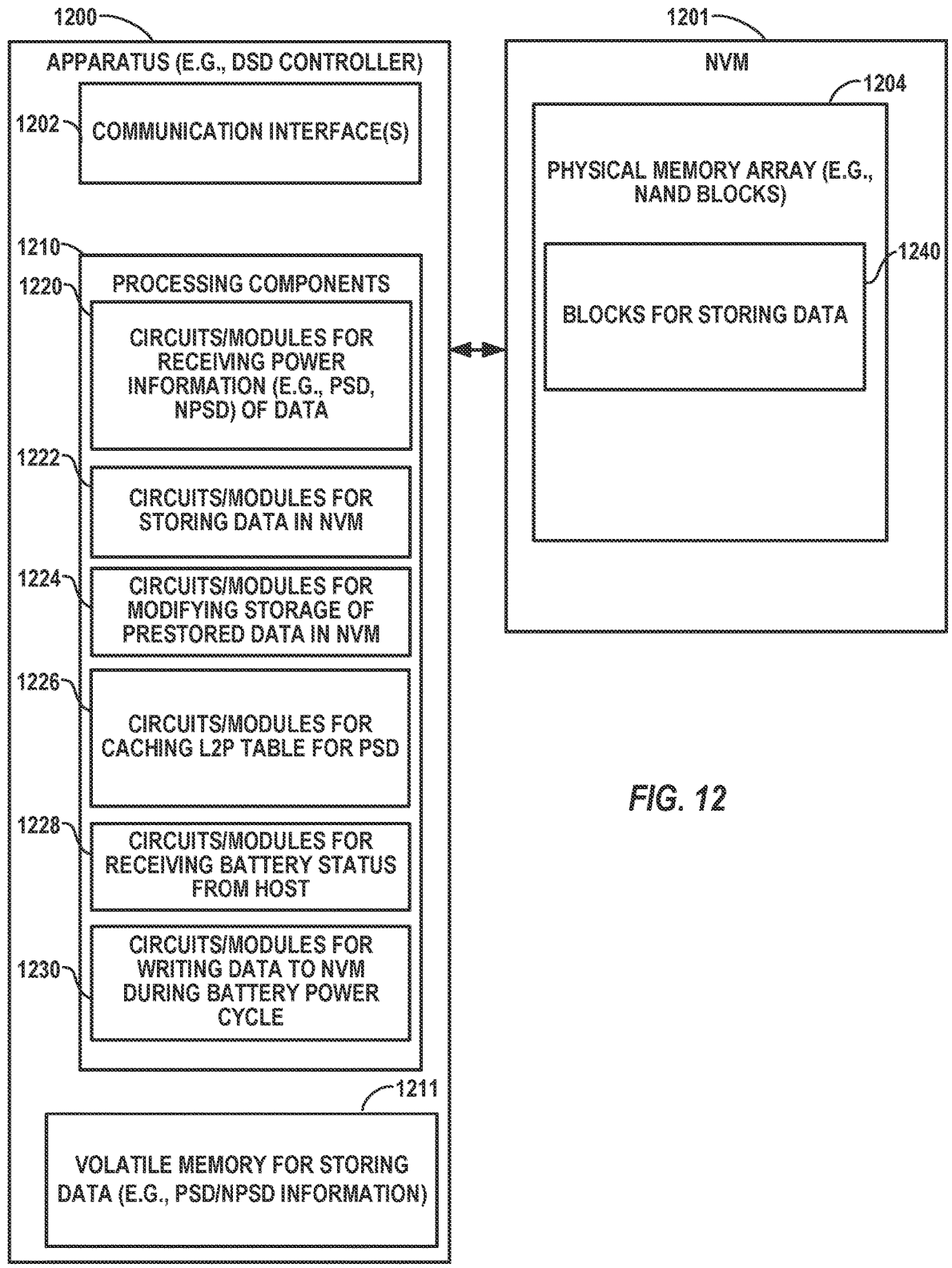
FIG. 12 is a diagram illustrating an embodiment of an apparatus 1200 configured for optimizing power consumption of the apparatus according to some aspects of the disclosure.

FIG. 12 illustrates an embodiment of an exemplary apparatus 1200 configured according to one or more aspects of the disclosure. The apparatus 1200, or components thereof, could embody or be implemented within a data storage controller such as an SSD controller (e.g., SSD controller 108) coupled to a NVM 1201 or some other type of NVM array that supports data storage. In various implementations, the apparatus 1200, or components thereof, could be a component of a processor, a controller, a computing device, a personal computer, a portable device, a wearable device, a personal digital assistant, a digital camera, a digital phone, an entertainment device, a medical device, or any other electronic device that stores, processes, or uses data.

The apparatus 1200 includes a communication interface 1202 and is coupled to a NVM 1201. The NVM 1201 includes physical memory array 1204 (e.g., one or more NAND dies). These components can be coupled to and/or placed in electrical communication with one another via suitable components, represented generally by the connection line in FIG. 12. Although not shown, other circuits such as timing sources, peripherals, voltage regulators, and power management circuits may be provided, which will not be described any further.

The communication interface 1202 of the apparatus 1200 provides a means for communicating with other apparatuses over a transmission medium. In some implementations, the communication interface 1202 includes circuitry and/or programming (e.g., a program) adapted to facilitate the communication of information bi-directionally with respect to one or more devices in a system. In some implementations, the communication interface 1202 may be configured for wire-based communication. For example, the communication interface 1202 could be a bus interface, a send/receive interface, or some other type of signal interface including circuitry for outputting and/or obtaining signals (e.g., outputting signal from and/or receiving signals into a DSD).

The physical memory array 1204 may include one or more NAND blocks 1240. The physical memory array 1204 may be accessed by the processing components 1210. In one aspect, the memory array 1204 may be the memory array 408 that stores data in NVM cells (e.g., NAND flash cells) organized in a two-dimensional array of rows and columns as described above in relation to FIG. 4. The physical memory array 1204 may include blocks 1240 for storing data, such as PSD and NPSD in one or more pages.

In one aspect, the apparatus 1200 may also include volatile memory 1211 such as a DDR for storing instructions and other information to support the operation of the processing components 1410, including storing PSD and NPSD information of data stored in the NVM (described above), active event lists, and any other information needed for battery power saving procedures as described herein.

The apparatus 1200 includes various processing components 1210 arranged or configured to obtain, process and/or send data, control data access and storage, issue or respond to commands, and control other desired operations. For example, the processing components 1210 may be implemented as one or more processors, one or more controllers, and/or other structures configured to perform functions. According to one or more aspects of the disclosure, the processing components 1210 may be adapted to perform any or all of the features, processes, functions, operations, and/or routines described herein. For example, the processing components 1210 may be configured to perform any of the steps, functions, and/or processes described with respect to FIGS. 1-11. As used herein, the term "adapted" in relation to processing components 1210 may refer to the components being one or more of configured, employed, implemented, and/or programmed to perform a particular process, function, operation and/or routine according to various features described herein. The circuits may include a specialized processor, such as an ASIC that serves as a means for (e.g., structure for) carrying out any one of the operations described, e.g., in conjunction with FIGS. 1-11. The processing components 1210 serve as an example of a means for processing. In various implementations, the processing components 1210 may provide and/or incorporate, at least in part, functionality described above for the components of SSD controller 108 of FIG. 1.

According to at least one example of the apparatus 1200, the processing components 1210 may include one or more of: circuit/modules 1220 configured for receiving power classification (PSD and NPSD) of data described above; circuit/modules 1222 configured for storing data in the NVM 1201 (e.g., array 1204); circuits/modules 1224 configured for modifying storage of prestored data in the NVM 1201; circuits/modules 1226 configured for caching L2P table for PSD; and circuits/modules 1228 configured for receiving battery status from host.

In at least some examples, means may be provided for performing the functions illustrated in FIG. 12 and/or other functions illustrated or described herein. For example, the means may include one or more of: means, such as circuits/modules 1220, for receiving power information of data (PSD and NPSD) from a host such that the apparatus can modify, move or relocate prestored data in the NVM 1201 as described above; means, such as circuits/modules 1222, for storing data in the NVM 1201, for example, storing the data in different types of memory cells (e.g., SLC, MLC, TLC, etc.) as described above; means, such as circuits/modules 1224, for modifying storage of prestored data in the NVM as described above; means, such as circuits/modules 1226, for caching L2P table for PSD as described above; means, such as circuits/modules 1228, for receiving battery status (e.g., power cycle, charging cycle) from a host as described above; and means, such as circuits/modules 1230, for writing data to the NVM during the battery power cycle as described above. In one aspect, each of the means described in this paragraph can be implemented using the SSD controller 108 and/or battery power reduction circuitry 109 of FIG. 1.

Additional Aspects

At least some of the processing circuits described herein may be generally adapted for processing, including the execution of programming code stored on a storage medium. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise. As used herein, the terms "run" or "runs" as used in conjunction with actions a DUT or processor performs, shall be construed broadly to mean that the respective component executes the respective action.

At least some of the processing circuits described herein may be arranged to obtain, process and/or send data, control data access and storage, issue commands, and control other desired operations. The processing circuits may include circuitry configured to implement desired programming provided by appropriate media in at least one example. For example, the processing circuits may be implemented as one or more processors, one or more controllers, and/or other structure configured to execute executable programming. Examples of processing circuits may include a general purpose processor, a digital signal processor (DSP), an ASIC, a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. At least some of the processing circuits may also be implemented as a combination of computing components, such as a combination of a controller and a microprocessor, a number of microprocessors, one or more microprocessors in conjunction with an ASIC and a microprocessor, or any other number of varying configurations. The various examples of processing circuits noted herein are for illustration and other suitable configurations within the scope of the disclosure are also contemplated.

Aspects of the subject matter described herein can be implemented in any suitable NVM, including NAND flash memory such as 3D NAND flash memory. More generally, semiconductor memory devices include working memory devices, such as DRAM or SRAM devices, NVM devices, ReRAM, EEPROM, flash memory (which can also be considered a subset of EEPROM), ferroelectric random access memory (FRAM), and MRAM, and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured. The semiconductor memory elements located within and/or over a substrate may be arranged in two or three dimensions, such as a two-dimensional memory structure or a three-dimensional memory structure.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements. One of skill in the art will recognize that the subject matter described herein is not limited to the two-dimensional and three-dimensional exemplary structures described but cover all relevant memory structures within the spirit and scope of the subject matter as described herein and as understood by one of skill in the art.

The examples set forth herein are provided to illustrate certain concepts of the disclosure. The apparatus, devices, or components illustrated above may be configured to perform one or more of the methods, features, or steps described herein. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Aspects of the present disclosure have been described above with reference to schematic flowchart diagrams and/or schematic block diagrams of methods, apparatus, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

The subject matter described herein may be implemented in hardware, software, firmware, or any combination thereof. As such, the terms "function," "module," and the like as used herein may refer to hardware, which may also include software and/or firmware components, for implementing the feature being described. In one example implementation, the subject matter described herein may be implemented using a computer readable medium having stored thereon computer executable instructions that when executed by a computer (e.g., a processor) control the computer to perform the functionality described herein. Examples of computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

The various features and processes described above may be used independently of one another, or may be combined in various ways. All possible combinations and sub-combinations are intended to fall within the scope of this disclosure. In addition, certain method, event, state, or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

While the above descriptions contain many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents. Moreover, reference throughout this specification to "one embodiment," "an embodiment," "in one aspect," or similar language means that a particular feature, structure, or characteristic described in connection with the embodiment is included in at least one embodiment of the present disclosure. Thus, appearances of the phrases "in one embodiment," "in an embodiment." "in one aspect." and similar language throughout this specification may, but do not necessarily, all refer to the same embodiment, but mean "one or more but not all embodiments" unless expressly specified otherwise.

The terminology used herein is for the purpose of describing particular aspects only and is not intended to be limiting of the aspects. As used herein, the singular forms "a," "an" and "the" are intended to include the plural forms as well (i.e., one or more), unless the context clearly indicates otherwise. An enumerated listing of items does not imply that any or all of the items are mutually exclusive and/or mutually inclusive, unless expressly specified otherwise. It will be further understood that the terms "comprises." "comprising." "includes" "including," "having," and variations thereof when used herein mean "including but not limited to" unless expressly specified otherwise. That is, these terms may specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR." that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of A, B, or C" or "A, B, C. or any combination thereof" or "one or more of A, B, or C" used in the description or the claims means "A or B or C or any combination of these elements." For example, this terminology may include A, or B, or C, or A and B, or A and C, or A and B and C, or 2A, or 2B, or 2C, or 2A and B, and so on. As a further example, "at least one of: A, B, or C" or "one or more of A, B, or C" is intended to cover A, B, C, A-B, A-C, B-C, and A-B-C, as well as multiples of the same members (e.g., any lists that include AA, BB, or CC). Likewise, "at least one of: A, B, and C" or "one or more of A, B, or C" is intended to cover A, B, C, A-B, A-C, B-C, and A-B-C, as well as multiples of the same members. Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

As used herein, the term "determining" encompasses a wide variety of actions. For example, "determining" may include calculating, computing, processing, deriving, investigating, looking up (e.g., looking up in a table, a datastore, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

What is claimed is:

1. An apparatus comprising:
    a battery configured to provide power to the apparatus during a battery power cycle and to be charged during a charging cycle;
    a non-volatile memory (NVM) coupled to the battery and comprising prestored data, wherein the NVM is divided into a plurality of distinct pages storing the prestored data; and
    one or more processors coupled to the battery and the NVM, and configured, individually or combination, to:
        receive, from a host, power sensitive data (PSD) information that indicates that a first portion of the prestored data has been used more frequently than a second portion of the prestored data during the battery power cycle; and
        modify storage of at least the first portion of the prestored data in the NVM based on the PSD information, wherein the one or more processors are further configured, individually or in combination, to:
            determine that first data in the first portion of the prestored data is not aligned across a page boundary of the plurality of distinct pages; and
            relocate the first data in the first portion of the prestored data to be within a page boundary of the plurality of distinct pages to thereby reduce a number of pages in the NVM used to store the first portion of the prestored data after the relocation.

2. The apparatus of claim 1, wherein the one or more processors are further configured, individually or combination, to:
  determine that the first data in the first portion of the prestored data occupies less than an entirety of a first page of the NVM; and
  relocate the first data to a second page of the NVM, wherein the second page is occupied by second data in the first portion of the prestored data, and the second data occupies less than an entirety of the second page.

3. The apparatus of claim 2,
  wherein the first page and the second page are located on different dies of the NVM.

4. The apparatus of claim 1,
  wherein the PSD information comprises a logical block address (LBA) range for the first portion of the prestored data; and
  wherein the one or more processors are further configured, individually or in combination, to determine, based on the LBA range, the first portion of the prestored data.

5. The apparatus of claim 1, wherein the one or more processors are further configured, individually or in combination, to:
  store the first portion of the prestored data in a first type of cells of the NVM; and
  store the second portion of the prestored data in a second type of cells of the NVM, wherein the first type of cells is configured to store more bits per cell than the second type of cells.

6. The apparatus of claim 1, wherein the one or more processors are further configured, individually or in combination, to cache a logical-to-physical (L2P) table with table entries for mapping the first portion of the prestored data and thereby to reduce an access time associated with retrieving the first portion of the prestored data from the NVM during the battery power cycle.

7. The apparatus of claim 1, wherein the one or more processors are further configured, individually or in combination, to:
  relocate, during the charging cycle of the battery, data of the first data in the first portion of the prestored data to align the prestored data with the page boundary of the NVM and to thereby reduce power consumption associated with future sensing operations used to retrieve the prestored data.

8. The apparatus of claim 7, wherein the one or more processors are further configured, individually or in combination, to:
  reduce the number of pages used to store the prestored data in the NVM during the relocation of the first data in the first portion.

9. The apparatus of claim 1:
  wherein the NVM comprises a first type of cells and a second type of cells, the first type of cells configured to consume less power than the second type of cells during a data writing procedure; and
  wherein the one or more processors are further configured, individually or in combination, to:
    receive an indication from the host to store data generated at the apparatus during the battery power cycle in the first type of cells; and
    store the battery power cycle generated data in the first type of cells.

10. The apparatus of claim 9, wherein the one or more processors are further configured, individually or in combination, to free up space in the first type of cells during the charging cycle by being configured to move data from the first type of cells to the second type of cells during the charging cycle.

11. The apparatus of claim 1, wherein the one or more processors are further configured, individually or in combination, to communicate with the host using wireless communication.

12. A method of operating a data storage device (DSD), the method comprising:
  providing a battery configured to provide power to the DSD during a battery power cycle and to be charged during a charging cycle;
  providing a non-volatile memory (NVM) coupled to the battery and prestored data in the NVM, wherein the NVM is divided into a plurality of distinct pages storing the prestored data;
  receiving, from a host, power sensitive data (PSD) information that indicates that a first portion of the prestored data has been used more frequently than a second portion of the prestored data during the battery power cycle; and
  modifying storage of at least the first portion of the prestored data in the NVM based on the PSD information, wherein the modifying comprises:
    determining that first data in the first portion of the prestored data is not aligned across a page boundary of the plurality of distinct pages; and
    relocating the first data in the first portion of the prestored data to be within a page boundary of the plurality of distinct pages to thereby reduce a number of pages in the NVM used to store the first portion of the prestored data after the relocation.

13. The method of claim 12, wherein the modifying further comprises:
  determining that the first data in the first portion of the prestored data occupies less than an entirety of a first page of the NVM; and
  relocating the first data to a second page of the NVM, wherein the second page is occupied by second data in the first portion of the prestored data, and the second data occupies less than an entirety of the second page.

14. The method of claim 13,
  wherein the first page and the second page are located on different dies in the NVM.

15. The method of claim 12,
  wherein the PSD information comprises a logical block address (LBA) range for the first portion of the prestored data,
  the method further comprising determining, based on the LBA range, the first portion of the prestored data.

16. The method of claim 12, further comprising:
  storing the first portion of the prestored data in a first type of cells of the NVM; and
  storing the second portion of the prestored data in a second type of cells of the NVM, wherein the first type of cells is configured to store more bits per cell than the second type of cells.

17. The method of claim 12, further comprising:
  caching a logical-to-physical (L2P) table with table entries for mapping the first portion of the prestored data and thereby to reduce an access time associated with retrieving the first portion of the prestored data from the NVM during the battery power cycle.

18. The method of claim 12, further comprising:
  relocating, during the charging cycle of the battery, the first data in the first portion of the prestored data to align the prestored data with the page boundary of the NVM and to thereby reduce power consumption associated with future sensing operations used to retrieve the prestored data; and reducing the number of pages used to store the prestored data in the NVM during the relocation of the data of the first portion.

19. The method of claim 12, wherein the NVM comprises a first type of cells and a second type of cells, the first type of cells configured to consume less power than the second type of cells during a data writing procedure; and wherein the method further comprises:
- receiving an indication from the host to store data generated during the battery power cycle in the first type of cells;
- storing the battery power cycle generated data in the first type of cells; and
- freeing up space in the first type of cells during the charging cycle by moving data at the DSD from the first type of cells to the second type of cells during the charging cycle.

20. An apparatus comprising:

a battery configured to provide power to the apparatus during a battery power cycle and to be charged during a charging cycle;

a non-volatile memory (NVM) coupled to the battery and comprising prestored data, wherein the NVM is divided into a plurality of distinct pages storing the prestored data;

means for receiving, from a host, power sensitive data (PSD) information that indicates that a first portion of the prestored data has been used more frequently than a second portion of the prestored data during the battery power cycle; and means for modifying storage of at least the first portion of the prestored data in the NVM based on the PSD information, wherein the means for modifying is configured to:
- determine that first data in the first portion of the prestored data is not aligned across a page boundary of the plurality of distinct pages; and
- relocate the first data in the first portion of the prestored data to be within a page boundary of the plurality of distinct pages to thereby reduce a number of pages in the NVM used to store the first portion of the prestored data after the relocation.

* * * * *